(12) United States Patent
Solberg

(10) Patent No.: US 12,332,064 B2
(45) Date of Patent: Jun. 17, 2025

(54) TWO-WAY PRIVACY ENABLED MAPPING AND ROUTING PLATFORM

(71) Applicant: Ryan Solberg, White Bear Lake, MN (US)

(72) Inventor: Ryan Solberg, White Bear Lake, MN (US)

( * ) Notice: Subject to any disclaimer, the term of this patent is extended or adjusted under 35 U.S.C. 154(b) by 230 days.

(21) Appl. No.: 18/196,525

(22) Filed: May 12, 2023

(65) Prior Publication Data

US 2023/0366685 A1 Nov. 16, 2023

Related U.S. Application Data

(60) Provisional application No. 63/341,659, filed on May 13, 2022.

(51) Int. Cl.
*G01C 21/34* (2006.01)
*G01C 21/36* (2006.01)

(52) U.S. Cl.
CPC ..... *G01C 21/3438* (2013.01); *G01C 21/3667* (2013.01)

(58) Field of Classification Search
CPC .............. G01C 21/3667; G01C 21/3438
See application file for complete search history.

(56) References Cited

U.S. PATENT DOCUMENTS

| | | | | |
|---|---|---|---|---|
| 10,732,000 | B2 * | 8/2020 | Jalasutram | G01C 21/3438 |
| 2009/0234577 | A1 * | 9/2009 | Rinscheid | G01C 21/3415 |
| | | | | 701/533 |
| 2014/0372334 | A1 * | 12/2014 | Wrentmore | G06Q 10/083 |
| | | | | 705/330 |
| 2019/0162546 | A1 * | 5/2019 | Duale | G01C 21/3438 |
| 2019/0311325 | A1 * | 10/2019 | Reblin | G06Q 10/0836 |
| 2021/0142321 | A1 * | 5/2021 | Kaczmarek | G06Q 10/08 |
| 2021/0164791 | A1 * | 6/2021 | Halun | G08G 1/09 |
| 2021/0278834 | A1 * | 9/2021 | Kendoul | G05D 1/0044 |
| 2024/0021073 | A1 * | 1/2024 | Kudo | G01C 21/20 |

FOREIGN PATENT DOCUMENTS

JP 2007072588 A * 3/2007
WO WO-2016134315 A1 * 8/2016

OTHER PUBLICATIONS

JP 2007072588 A—machine translation (Year: 2007).*

* cited by examiner

*Primary Examiner* — Dino Kujundzic
(74) *Attorney, Agent, or Firm* — Schwegman Lundberg & Woessner, P.A.

(57) ABSTRACT

Systems and techniques for two-way privacy enabled mapping and routing platform are described herein. A destination may be determined for a person-to-person (P2P) interaction between a first user and a second user. A current location may be obtained for the first user. Routing data may be generated between the current location and the destination. A set of route segments may be created using the routing data. First route segment data for a first route segment of the set of route segments may be transmitted to generate a routing display on a display of a computing device of the first user. Upon a determination that the first user has reached a checkpoint included in the first route segment, second route segment data for a second route segment of the set of route segments may be transmitted to the routing display. Upon a determination that the first user is in vicinity of the destination, destination data may be transmitted to the routing display.

20 Claims, 5 Drawing Sheets

TWO-WAY PRIVACY ENABLED MAPPING AND ROUTING PLATFORM

CLAIM OF PRIORITY

This patent application claims the benefit of priority to U.S. Provisional Application Ser. No. 63/341,659, filed May 13, 2022, and which is incorporated by reference herein in its entirety.

TECHNICAL FIELD

Embodiments described herein generally relate to electronic mapping and route guidance and, in some embodiments, more specifically to two-way privacy enabled route guidance.

BACKGROUND

Electronic mapping and route guidance may provide a user with information to navigate from an origination to a destination. Route guidance may evaluate map data (e.g., streets, intersections, etc.) to create a path that the user may follow to reach the destination. The user may know the destination and may choose to follow the route or choose a different route.

Person-to-person transactions may pose a risk to the participants if a face-to-face meeting will be used to complete a transaction started online. For example, a buyer and seller may be unfamiliar with each other and may be subject to personal harm if the other party has nefarious intentions. In another example, the seller may need to disclose a personal location to a buyer or multiple potential buyers to complete a transaction. This may expose the location of the seller and open the seller to personal injury, theft, etc.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
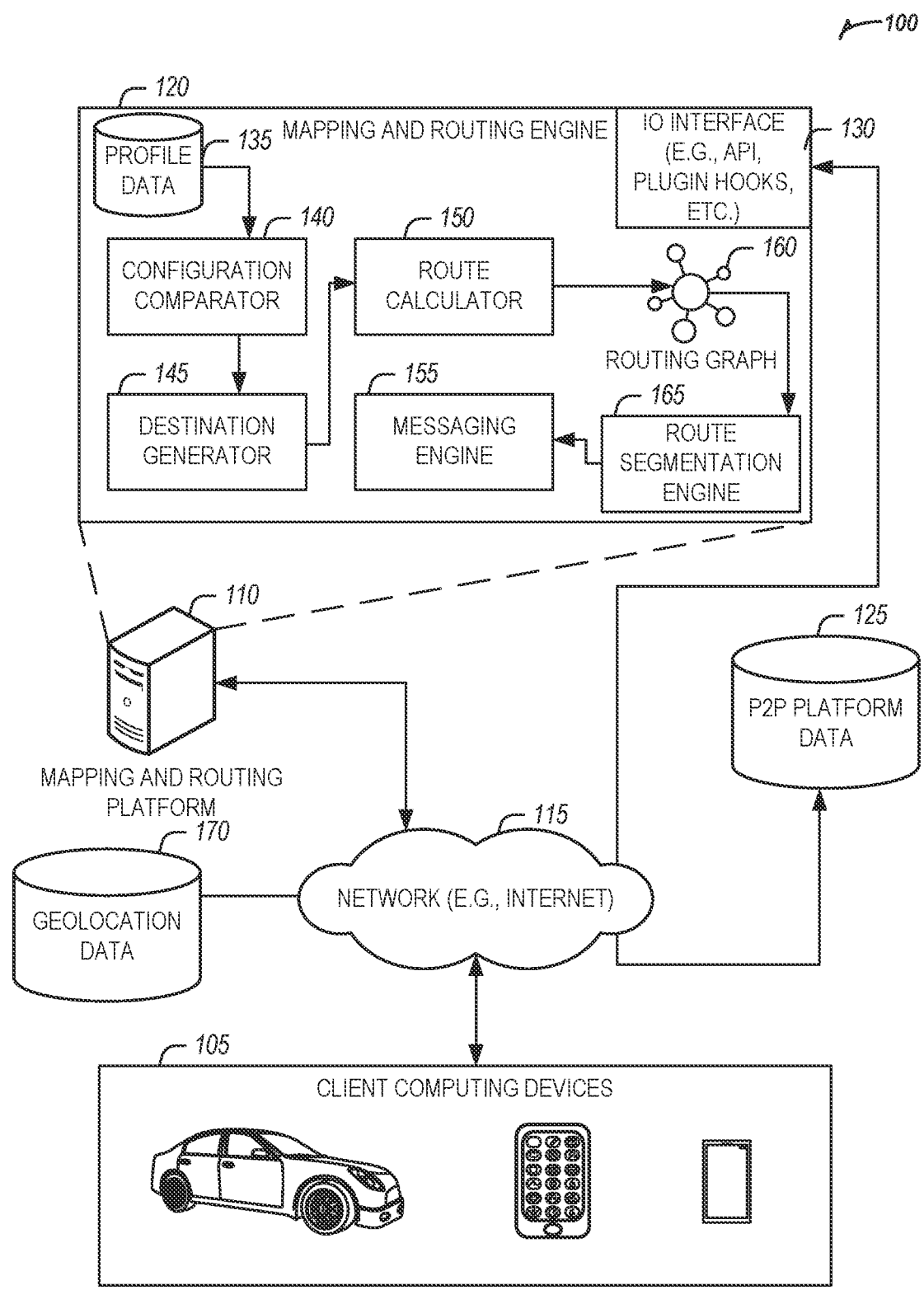
FIG. 1 is a block diagram of an example of an environment and a system for a two-way privacy enabled mapping and routing platform, according to an embodiment.

Person-to-person (P2P) interactions may be initiated online using a variety of platforms that enable the exchange of product and services, dating, meetups, etc. These P2P interactions may be conducted between two or more parties that may not know each other outside of a digital persona established via the online interaction. The digital personas are often anonymous and may not be verifiable or may be manipulated. There may be risks posed to the parties to the transactions when a face-to-face meeting is part of a P2P interaction.

In conventional P2P interactions, one of the parties may be compelled to provide an address or meeting location for the interaction. The party providing the location may be at risk of the other party releasing the information to other entities outside of the P2P interaction or may use the information for nefarious purposes (e.g., criminal activity, etc.). Conversely, the party that receives the meet-up location that is unknown to the receiving party, may be concerned about possible threats at the provided location (e.g., criminal activity by the location provider, etc.). Thus, there is a need to protect both parties when conducting a face-to-face meeting.

The systems and techniques discussed herein address technical issues of providing a two-way privacy enabled route guidance to participants of P2P interactions by masking location data of the participants until (or near) the point of destination of the participants. The systems and techniques discussed herein allow each party to configure meeting location configuration options that are evaluated to identify locations that provide overlap between the respective configuration options. Meeting location configuration options may include, by way of example and not limitation, preferences for public meeting locations, time of day (e.g., used to find locations available during the time periods indicated, etc.), distance, population density (e.g., urban, suburban, rural, etc.), vehicle traffic, foot traffic (e.g., how busy a location is, etc.), open area preferences (e.g., parks, parking lots, inside buildings, etc.), etc. Additionally or alternatively, one party to the P2P interaction may set a meeting location. The meeting location is obtained as input to a mapping and routing platform that secures and masks the location to prevent disclosure to other parties to the P2P interaction. The mapping and routing platform evaluates location data (e.g., captured using location services of a mobile device, input by the user, etc.) of a party to the interaction to generate a route to the destination without disclosing the destination to the user.

In an example, the user to be routed may have location configuration options configured that may conflict with the location provided by the location-providing user. The location-providing user may be prompted to select an alternate location or may be asked to send an override request to the user to be routed. An override request may be generated for the user to be routed that may indicate the configuration options that conflict with the location without disclosing the location. The user to be routed may be provided with a number of response options that may include, by way of example and not limitation, an option to accept the override and begin the route guidance, decline and cancel the interaction, input a location that may reverse the roles of the users, or ask that a mutually acceptable (e.g., based on respective configuration options of the users, etc.) neutral location (e.g., negotiated location, acceptable location, etc.) be selected. The location-providing user may be provided with response options in kind until a party cancels the interaction or a location has been negotiated. If the location-providing user accepts a neutral location, both users become routed users with neither party being privy to the final meeting location until the meeting is imminent (e.g., a user has progressed within a threshold distance of the final location, etc.). In an example, if one user arrives before the other user, the first-arriving user may continue to receive route guidance similar to that of a circling plane until the other user reaches the threshold. This prevents the first-arriving user from gaining an advantage by learning the meeting location before the later-arriving user. It should be understood that while the examples discussed herein describe mapping and routing between two users, the techniques described may be applied to P2P interactions including more than two users. For example, a route may be provided to multiple buyers, a group of event attendees, etc.

In an example, a graph structure may be generated for paths between the location of the user and the destination. The graph structure may be segmented based on distance, time, etc. between the location of the user and the destination. The mapping and routing platform may provide the user with route guidance for an initial segment of the graph structure to guide the user along a path towards the destination. As the user progresses along the path, additional route guidance is generated and output to the user as the user approaches the next segment. When route guidance is generated for the final segment, the location of the user continues to be tracked until the user reaches a proximity threshold of the destination. The user is then provided with details of the final destination and an indication that the user has arrived at the location. The user is provided an interactive control that provides the user with the ability to end the route and end the interaction at any point during traversal of the route. Thus, if the user becomes uncomfortable with the surroundings or the route, the user may end the interaction at the location provided by the other user or negotiate by the system based on configuration options. The location data of the enroute user is also secured and is not released to the other party. It should be understood that a variety of route calculation techniques may be used to generate and segment routes to guide the user toward the final destination.

In an example, the user may be provided with an approximate time to destination, distance to destination, etc. to allow the user to determine if they want to continue to proceed to the location and to provide the user with an estimation of progress without disclosing specifics of the destination. In another example, the route guidance provided to the user may direct them to a general location (e.g., a city, town, landmark, etc.) and may not direct the user on a shortest or most direct route to further mask the destination and to increase the difficulty of reproducing the route or predictability of the destination.

The destination may be selected automatically by the mapping and routing platform based on user configuration options or may be provided by one of the users. If the destination has been automatically selected, each party to the P2P interaction may be provided route guidance using similar techniques so that the users are routed to arrive at the selected destination at a similar time. If a user has provided the destination, the user that provided the destination may be provided with periodic notification of the progress of the user being routed without disclosing the location of the routed user. This allows the destination providing user to time an arrival at a distant location or to be prepared for arrival of the routed user. The destination providing user is provided with an interactive control similar to that provided to the routed user that may be used to cancel the route at any point during the traversal (or before initiation of traversal) of the route by the routed user. In an example, the destination providing user may be notified if the routed user does not begin traversing the route by a specified (e.g., manually or automatically) time (e.g., a specific time, the end of a time window, outside a threshold, etc.). The notification enables the destination providing user to cancel (e.g., revoke, etc.) the route if it appears the routed user is not going to complete the transaction. The routed user is provided with an indication of the cancellation and the route guidance ends without providing an indication of the final destination to the routed user. The routed user may then be presented with an option to be routed to another location (e.g., home, a store, a meeting destination for another P2P interaction, etc.). The systems and techniques discussed herein provide a technical solution for the technical issue presented in conventional mapping and routing technology how to route a user to a destination that is unknown to them (and possibly another party) without disclosing the destination until the meeting is imminent.

In an example, users may register with the mapping and routing platform and establish a user profile for each user. A user may be asked to provide personally identifiable information that may be used to verify the identity of the user. The user may be verified using a variety of user authentication techniques to attest to the authenticity of the identity of the user. Another user that is engaged in a P2P interaction with the user may be provided with an indication of the verification of the user identity without revealing the actual identity of the user or any personally identifiable information. A feedback mechanism may allow other users to rate interactions with the user to establish a reputation score that may be used by another user to judge the safety and reliability of the user. User validation and reputation may be available as configuration options for a user profile. For example, a user may require that users that they conduct P2P interactions with be verified or may set a threshold for reputation scores. This allows a user to reduce potential risk of harm for a nefarious party in a P2P interaction. Users may be rated in part based on whether the user has terminated P2P interaction before a routed user is enroute or after a routed user in enroute. In an example, P2P interactions that are canceled while enroute may lower the reputation score of a user who cancels the transaction more than if the cancelation of a route had happened before traversal began. For example, the user that cancelled the P2P interaction may be assessed a score of −1 for a P2P interaction cancelled before the routed user begins the route and −2 for a P2P interaction cancelled after the routed user begins to traverse the route. In an example, the score assessed may be deducted from a total reputation score of the user, may correlate to a weight applied in a score adjustment algorithm, etc. The cancellation subset of the reputation score may be used by a routed user to judge the possibility of a P2P interaction being cancelled or by a location-providing user to approximate the probability that the routed user will complete the route to fulfill the P2P interaction.

The mapping and routing platform may include an application programming interface (API) that may allow online providers to provide access to the mapping and routing system to their users for conducting P2P face-to-face interactions. A variety of application plugins may be used to access functions of the mapping a routing system to facilitate a P2P interaction initiated online to transition to the mapping and routing platform for completion of an offline face-to-face portion of the P2P interaction.

Interactions derived from internet advertisements (e.g., for products and service provided by individuals, etc.), dating sites, meetup (e.g., shared interest meetups, making new friends, etc.), etc. involving mutually agreed-to meeting places may pose issues for the parties involved. Sometimes these meetups are conducted away from a home of a party (e.g., a seller, etc.) for safety reasons at public places such as police stations, parking lots, and the like. The meetups may involve travel distances of hundreds of miles as parties coordinate mutually agreed to meeting places for the interactions. For example, a sale may be made at the home of a seller and the seller may be reluctant to give out the home address early in the information exchange. The release of the address may cause a security risk for themselves or may draw unwanted attention to the location of a high value item like a car, antique, etc. In addition, there are security concerns for both parties due to the lack of knowledge of the true identity of the parties and traveling to an unknown location.

A seller may be unsure if a buyer is enroute to the destination and may rely on an indication from the buyer of an arrival time. If the buyer is enroute, the buyer may be driving and may not be able to provide updates on progress. Meetups may be a wasted opportunity when the buyer does not arrive, gets lost, is late, etc. Potential sellers may be deterred from engaging in sales because of the issues and hassles of managing a face-to-face meeting to complete a transaction.

The mapping and routing platform is a directional system that updates parties to a P2P interaction at various points of travel as the progress of the parties toward a destination in real-time. The mapping and routing platform may execute on a computing device, a cloud service platform, a mobile computing device, a server computing device, as a variety of software applications executing on a variety of computing devices that work in conjunction to deliver the features of the mapping and routing platform. The mapping and routing platform may obtain geolocation information from user mobile devices, global positioning system (GPS) receivers/sensors, location based services of the mobile device, an infotainment system of an automobile, etc. for use in calculating locations, waypoints, routes, etc. Step-by-step directions may be generated and presented to a display device of the user (e.g., a mobile device, an automobile infotainment system, navigation device, etc.). In an example, the routed user may select a mode of transit or a mode of transit may be detected for the routed user. The step-by-step instructions may be generated in part based on the mode of transit. For example, if the routed user is walking, the step-by-step directions may be at city block intervals an utilize pedestrian routes. If the routed user is driving, the step-by-step directions may be provided in miles increments and may utilize roadways. If the user is using mass transit to travel to the destination, the step-by-step directions may be in stop intervals for mass transit routes and may utilize bus routes, rail routes, ferry routes, and the like. As the user follows the step-by-step directions, the route progression is tracked and details of the progression (e.g., estimated time of arrival, distance, etc.) may be provided to the other user (e.g., via text message, email, display in a user interface, etc.). The location-providing user may adjust granularity of updates (e.g., frequency of updates, a threshold for notification in time or distance, etc.).

In an example, the destination may be masked and expressed as a point near an intersection. The destination (e.g., a home address of the location-providing user, etc.) is masked until the routed user has progressed near the destination. In addition to securing the address of the location-providing user, the progression of the routed user provides an indication to the location-providing user that the routed user has committed to following through on the P2P interaction. In an example, the address may be disclosed to the routed user upon acknowledgement of a notification transmitted to the location-providing user. For example, the routed user may be approaching a threshold distance from the destination and a notification may be transmitted to the location-providing user. The location-providing user may respond (e.g., select an acceptance control in the message, respond via text message, etc.) to accept release of the destination address and the address may be displayed to the routed user. Release of the destination address provides an indication to the routed user that the location-providing user is committed to completing the P2P interaction. The step-by-step directions continue to be transmitted to the routed user with the final destination displayed only when the user is within a threshold distance from the destination. The directional information such as distance to the destination, estimated time of arrival (ETA), etc. is displayed to the routed user to provide the routed user with sufficient information to plan and conduct travel. The One or more parties to a P2P interaction may initiate routing by creating a new (or continued) P2P interaction session. The initiating party may provide the destination, ask that the destination be automatically selected, or that another party to the P2P interaction provide a destination. The destination may be set and a notification may be transmitted to users to be routed (e.g., via text message, email, link, mobile application notification, etc.) that prompts the user to be routed to provide (or allow detection of) a starting address to begin routing. Progress notifications are automatically generated and transmitted to the location-providing user (or both parties in the case of a neutral location) with travel progress of the other party (or parties) without revealing the location of the routed user(s).

For example, a link to the mapping and routing platform may be embedded into a CRAIGSLIST® ad reply from a seller with the destination address enabled only when a seller indicates via a reply or when the buyer is authorized to be routed and the release is approved by the seller (e.g., manually, upon the buyer reaching a proximity threshold, etc.). For example, the seller may receive a prompt the states "Allow buyer to receive driving directions to your destination?" If the seller responds in the affirmative (e.g., selects a "Y" or "Yes" button, checks a box, replies "yes" via text, etc.), the buyer receives the confirmation and an option to begin routing.

In an example, a user may be provided with a modification control the enables the user to modify the final destination if a problem occurs in the P2P interaction while the routed user is in transit, if the location-providing user decides to change the meeting location, etc. If the route has not begun, a notification may be transmitted to the routed user that indicates the adjustment (e.g., new distance, ETA, etc.). For example, the routed user may receive a notification that states "Seller has modified destination" with the updated distance or time remaining to the destination resulting from the change. If the routed user is enroute, a similar notification may be transmitted and the routed user may be prompted to continue or cancel the route guidance and P2P interaction. In an example, expected arrival checkpoints may be generated along the route with corresponding ETAs. If a routed user fails to reach a checkpoint at an expected ETA, a period of delay may be calculated, by way of example and not limitation, by tracking offsets between the ETAs and actual arrival times, calculating a new ETA based on average traversal speed, etc. The other users may be notified of the delay and the user may be presented with an option to pause the route guidance until the users reach an approximately equal ETA. This may be helpful in long distance meetings by allowing a user that is ahead to refuel, rest, etc. while the other user makes more progress to the destination reducing stops that may delay the ultimate ETA. The party that is delayed may also be notified of the progress of the other user so they may avoid making unnecessary stops that may cause further delays. The user may also be informed when the other user is in proximity of the final destination or has arrived at the final destination.

While the routed user is enroute, the other party to the P2P interaction may terminate the route guidance if an interrupting event occurs. For example, a buyer and seller may agree to a price and the buyer begins to traverse the route. The seller may receive a higher cash offer and may terminate the route guidance to the buyer (e.g., subject to conditions provided to the seller, etc.). To prevent unexpected route cancellations, the routed user may be provided with conditions of the P2P interaction. For example, the buyer may receive a message before route guidance begins that the "Seller has opted for conditional instructions to destination" along with the conditions before the route guidance begins. If the routed user accepts, the route guidance will begin subject to the conditions. If the routed user rejects, the P2P interaction may be cancelled or the other party may be notified that the routed user will not begin the route under the provided conditions so that the other party may alter the conditions to negotiate conditions that the routed user will accept to begin the route. In an example, phone call links may be provided that allow the buyer and seller to discuss the terms. In an example, an intermediary telephone service, audio conferencing system, etc. may be used to conceal the telephone numbers of the parties to prevent the dissemination of personally identifiable information such as telephone number, name, etc. If hostilities erupt between the parties, either party may cancel the P2P transaction and communication ceases.

In an example, a cost calculator component may obtain average fuel prices along a potential route to the final destination. The cost calculator may estimate a distance and prompt the routed user to provide an average miles per gallon, fuel type, and other information for a vehicle that may be used to traverse the route (e.g., via a user interface at the time of routing, during profile creation/update, etc.). The cost calculator may use the average fuel price, estimated distance, and the miles per gallon provided by the user to calculate an estimate fuel cost for completing the route (e.g., to the destination, from the destination, both). In an example, the cost calculator may obtain a price for an object or service to be obtained at the final destination and may add the fuel cost to the price to calculate a total cost for the item including transportation. This may enable the routed use to determine if shipment of an item may be more economical or whether it may be more economic to obtain a service closer to the current location.

In another example, users may upload a picture of a vehicle, location, the user, or other photographic information that may assist the users to find each other at the final destination to be included with the directions. The photo may be displayed when the route guidance begins or may be concealed until the final destination is revealed to the routed user to maintain privacy. For example, a location at a shopping center may be provided when the final destination is displayed indicating that the meeting will be near the area of the shopping center indicated in the photo. In another example, coordinates may be provided to a mobile device of the routed user and the route guidance may change to walking directions that lead the routed user (and the location-providing user) to the precise location for the P2P interaction. In an example, the location-providing user may pin (e.g., drag a location indicator to a location on a map, etc.) a location for the final destination and the routed user may be provided walking directions to the pinned location. Additionally or alternatively, the routed user may be presented with an interface for pinning the precise location and the location-providing user may be provided walking direction to the location pinned by the routed user.

The systems and techniques discussed herein improve the technical capabilities of mapping and routing to coordinate meetups by providing several confirmations of progress of the routed user(s) and an ETA without the routed user knowing precisely where they are going until a point in the final segment of the route.

In an example, a buyer and a seller may have exchanged emails in regard to the purchase of a given item on CRAIGLIST® or some other online or traditional source. The buyer agrees to meet to purchase the item. The seller may create a profile and register an account on the mapping and routing platform. The seller may purchase points (or other credits, on demand, etc.) that may be redeemed for providing directions. The buyer may or may not establish an account and use features of the service (for free or for purchase). Points may be spent on a prorated basis (e.g., depending on mileage of the route, etc.). Short trips may have a lower points value than more elaborate P2P routes that may span hundreds of miles. The points may be spent according to the number of times a set directions are used (e.g., a discount for routes that have previously been calculated, etc.) and more elaborate directions (e.g., requiring more processing for route calculation, increased messaging/notification, etc.) have higher points than simple directions. Users may be reminded when points are running low and may be prompted to replenish the points account.

The seller may select a tab, button, or other control to "send directions inquiry" to the buyer. The seller may be asked to provide a preferred meet up address, major landmark, ask that the location be automatically assigned, etc. A preliminary link may be transmitted to the prospective buyer that asks the prospective buyer questions such as: "Seller wants to meet you. Can you provide your starting address?", "Please provide your approximate departure time to the meeting place."

Responses from the buyer may be received and a response may be generated and transmitted to the seller that may include prompts such as: "Your buyer is approximately 22 miles from the designated location.", "This transaction will cost 66 points or 66 cents. OK? Y or N." If the seller confirms, the seller may be prompted for preferences such as: "Update frequency of buyer travel progress check one: turn by turn updates, only major interstate travel changes, no updates except when buyer leaves and when five minutes from destination.", "Suppress actual destination address until buyer is two minutes from destination?", "Allow for directions to be terminated x minutes from destination?", "Send picture on file to assist with meetup?"

The responses are obtained from the seller and a confirmation screen is presented to seller to approve the P2P interaction. Receipt of the approval triggers transmission of a link, mapping code, mobile notification, or other mechanism for initiating route guidance to the buyer to provide step-by-step directions, a picture attachment(s) if any, and any disclosure that indicates that directions may be terminated by seller.

Initiation of the route guidance is received as acceptance and the-step-by step directions are generated for transmission to the buyer (e.g., the routed user) and updates may be generated and transmitted to the seller according to preferences configured by the seller (e.g., the location-providing user). A seller may receive a notification (e.g., an email, text, etc.) when the buyer (e.g., the routed user, etc.) is close and may be presented with an option to confirm that the final address may be revealed to the buyer. Revealing the final destination to the buyer may include a notification that includes a photograph attachment that the seller has provided of a car, home, or where the meeting is taking place as a seller-approved option that the buyer may receive.

FIG. 1 is a block diagram of an example of an environment 100 and a system 120 for a two-way privacy enabled mapping and routing platform, according to an embodiment. The environment 100 may include client computing devices 105 (e.g., a mobile computing device, a tablet computing device, an infotainment computing system of a vehicle, a GPS receiver, etc.), a mapping and routing platform 110 (e.g., a server computing device, a cloud computing service, a server cluster, etc.), person-to-person (P2P) platform data 125 (e.g., data for a variety of P2P platforms including commerce sites, dating sites, meetup sites, etc.), and geolocation data 170 (e.g., mapping data, location data, geographical information system (GIS) data, etc.). The client computing devices 105, mapping and routing platform 110, P2P platform data 125, and geolocation data 170 may be connected via a network 115 (e.g., the internet, cellular network, wired network, wireless network, etc.).

The mapping and routing platform 110 may include the system 120. In an example, the system 120 may be a mapping and routing engine. The system 120 may include a variety of components including an input/output (IO) interface 130, profile data 135, a configuration comparator 140, a destination generator 145, a route calculator 150, a messaging engine 155, a routing graph 160, and a route segmentation engine 165. The components of the system 120 may execute on a single computing device (e.g., server computing devices, field programmable gate arrays (FPGAs), application specific integrated circuits (ASICs), etc.) or may be spread across a variety of computing devices individually or in groups. The components may be implemented as hardware devices or as software circuits stored as instructions in machine-readable memory and executed by a processor.

The IO interface 130 may include an application programming interface (API), plugin hooks, and other connectivity technologies that provide input and output connectivity with the P2P platform data 125 and other applications and data. The P2P platform data 125 may include a variety of data elements of P2P applications such as, by way of example and not limitation, P2P commerce websites, dating websites, social media websites, meetup websites, etc. The data elements may include details of a P2P interaction including a proposed face-to-face meetup, details of the interaction, etc.

The profile data 135 may include user data for users of the system 120 including P2P interaction configuration options, personal identification information, authentication credentials, etc. The profile data 135 may be populated upon account creation of a user or may be temporarily created for a P2P interaction session. The configuration comparator 140 may receive the profile data 135 as input for a plurality of users and may evaluate the profile data 135 for the users to identify common (or compatible) configuration options that may be output as constraints for the destination generator 145. For example, configuration options such as, by way of example and not limitation, meeting location trait preferences (e.g., preferences for indoor locations, outdoor locations, location types, meeting times, maximum travel distance, etc.) of each user (e.g., from the respective profile of the user, etc.) may be compared to determine a meeting location that may be acceptable to both users. The configuration comparator 140 may utilize a variety of automated comparison algorithms including fitness functions, sorting functions, selection functions, and classification functions to evaluate locations using preference data of the users and location attributes as input to output a selected location that is determined to be a most probable (e.g., having the largest probability value, etc.) suitable location for both users.

The destination generator 145 may receive the output from the configuration comparator 140 and location data for the plurality of users (e.g., obtained from the client computing devices 105, based on inputs provided by the plurality of users, etc.) to select a destination for the P2P interaction using the geolocation data 170. The geolocation data 170 may include a variety of geolocation data elements that may include geographical coordinates (e.g., longitude, latitude, addresses, etc.) for locations including buildings, streets, commercial locations, residential locations, public locations, etc. The destination may be selected based on location attributes contained in the output of the configuration comparator 140, distance between the plurality of users, etc. In an example, a user may provide an address to the destination generator and the destination generator 145 may use the provided destination as the destination. In an example, the provided destination may be altered based on configuration parameters output by the configuration comparator 140. In another example, the provided destination may override configuration parameters output by the configuration comparator 140.

The route calculator 150 may receive the destination output by the destination generator 145 and may generate a routing graph 160 for one or more users of the plurality of users using the geolocation data 170. The routing graph 160 may include a data structure that includes nodes that include locations with edges that represent streets between the locations. The data in the routing graph 160 may be used to generate a variety of routes between a location of the one or more users and the destination. For example, the route calculator 150 may select a radius (e.g., in miles, kilometers, etc.) between the location of the user and the destination and may obtain geographical data for the radius from the geolocation data 170. The route calculator 150 may identify a variety of locations between the user location and the destination as nodes and may use streets between the nodes as connection edges. In an example, nodes may be generated for the user location and the destination and a variety of edges may be generated between the nodes to establish a variety of alternate routes between the user location and the destination within the radius using the geolocation data 170.

The route segmentation engine 165 may receive the routing graph 160 as input and may generate route segments that include a portion of the edges between the destination node and the user location node or between intermediate nodes between the destination node and the user location node. The segments may be generated based on the total distance between the user location node and the destination node so as to provide sufficient route guidance to the user to begin travel without disclosing (or making predictable) the final destination. For example, if a total route is one mile, the segments may be generated to be approximately a quarter mile each. In an example, if the total distance is less than a lower limit threshold, the segments may be generated that route the user past the destination and then back to the destination to meet the lower limit.

The messaging engine 155 may output a variety of information to the client computing devices 105. The messaging engine 155 may output map data and route segment data to a graphical user interface of a client computing device via a mapping application of the client computing device, a standalone mapping user interface application of the client computing device, a webpage in a web browser of the client computing device, etc. The map data and route data may be used to provide interactive route guidance to the user. The messaging engine 155 may track the progress of the user along the route and may generate status messages that may be transmitted to a client computing device of another user. The messaging engine 155 creates a notification schedule using the route segment data to provide periodic notifications to a user regarding progress of the other user. If both users are provided routes to a destination, the users may be notified of the progress of the other user via messages transmitted according to the notification schedule.

When the user progresses to checkpoint of a segment, the messaging engine 155 may request the next route segment from the route segmentation engine 165. The next segment data is output to the client computing devices 105 and additional route guidance is provided. When the user reaches the checkpoint of the final route segment, the destination may be revealed to the user via transmission of the destination and any related information (e.g., photograph, final meeting details, etc.) to the client computing devices 105 of the user. In an example, upon progression of the user to the final checkpoint, a notification may be transmitted to another user to authorize release of the destination and the destination may be revealed upon receipt of the authorization. In an example, a set of route segments may be generated and transmitted to a client application executing on a client computing device of the user and a the client application may display route segments to the user as the route progresses. If a route is cancelled, the client application ceases display of route segments and deletes the route data from the client computing device.

The messaging engine 155 may cause a variety of controls to be displayed or activated on the client computing devices 105 that may include, by way of example, and not limitation, a cancel route button, a call button, a message button, etc. The cancel route button may allow a user to cancel the route and notify other users that the P2P interaction has been canceled. The call button may establish an anonymized call between parties to the P2P interaction. The message button may establish an anonymized message stream (e.g., via text message, etc.) between the users.

The messaging engine 155 may determine that the user has reached the destination (or is in the vicinity of the destination) and may work in conjunction with the route segmentation engine 165 to generate walking directions to the precise destination for output to the user. The messaging engine 155 may generate and transmit a message to the other P2P interaction users when the user reaches the destination. The message may be transmitted to a computing device of a user via a text messaging application, an electronic mail allocation, a stand alone privacy enabled routing applications, a navigation application, etc. In an example, the client application may receive the entire route and other auxiliary information and may securely store the data and reveals portions of the data (e.g., route segments, etc.) based on GPS location of the computing device. In an example, the GPS location of the computing device may be determined via location services provided by the computing device, etc. In an example, the location services information is used locally by the client application to determine the progress of the routed user without exposing the location data of the routed user. In an example, the route may change based on segues of the routed user or based on a destination change initiated by the user that provided the destination and the data transmitted to the computing device may be updated to recalculate the route segments and determine when data may be revealed based on progression of the routed user (e.g., based on geolocation data of the computing device, etc.).

Figure 2:
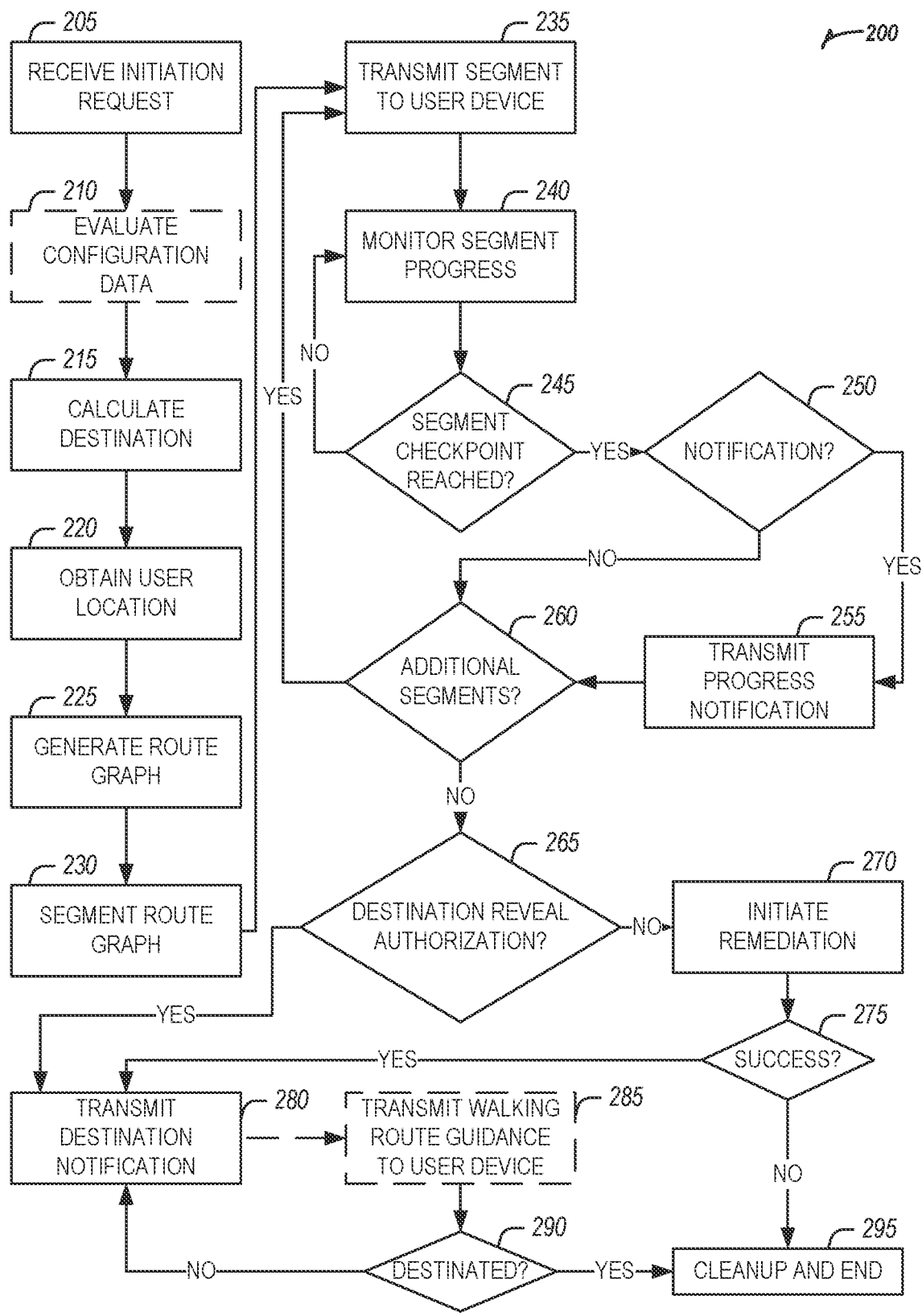
FIG. 2 illustrates a flow diagram of an example of a process for two-way privacy enabled mapping and routing platform, according to an embodiment.

FIG. 2 illustrates a flow diagram of an example of a process 200 for two-way privacy enabled mapping and routing platform, according to an embodiment. The process 200 may provide features as described in FIG. 1.

An initiation request may be received to begin a P2P interaction (e.g., at operation 205). For example, a user may request that a face-to-face meeting be established for a P2P interaction such as an item sale, date, meetup, etc. In an example, users (e.g., parties to the P2P interaction, etc.) may establish a profile that includes meeting location configuration options. In an example, the configuration options of the users may be evaluated (e.g., by the configuration comparator 140 as described in FIG. 1, etc.) to determine a configuration acceptable to the users (e.g., at operation 210).

A destination may be calculated (e.g., by the destination generator 145 as described in FIG. 1, etc.) for the P2P interaction (e.g., at operation 215). A location of the user may be obtained (e.g., by the route calculator 150 as described in FIG. 1, etc.) from a client computing device (e.g., at operation 220). A route graph (e.g., the routing graph 160 and described in FIG. 1, etc.) may be generated (e.g., by the route calculator 150 as described in FIG. 1, etc.) between the location of the user and the destination (e.g., at operation 225). The route graph may be segmented (e.g., by the route segmentation engine 165 as described in FIG. 1, etc.) into a plurality of route segments (e.g., at operation 230).

Figure 3A:
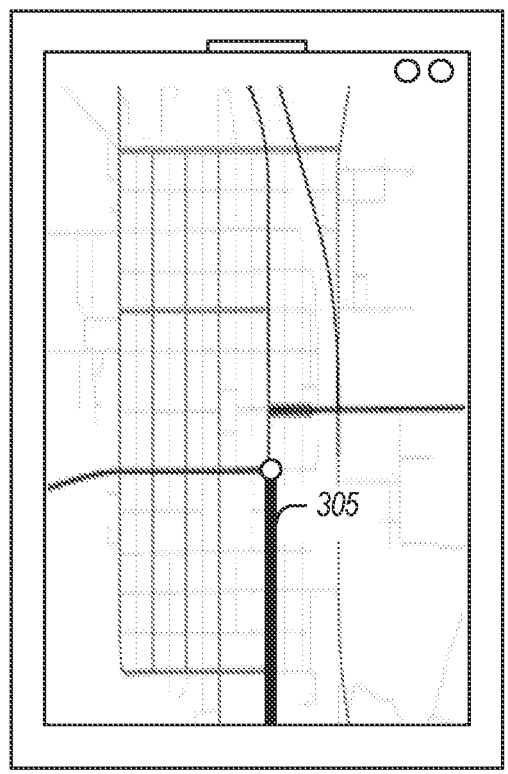
FIGS. 3A and 3B illustrate an example of a graphical user interface for a two-way privacy enabled mapping and routing platform, according to an embodiment.

The segment may be transmitted (e.g., by the messaging engine 155 as described in FIG. 1, etc.) to the client computing device of the user (e.g., at operation 235). FIG. 3A illustrates an example, of an initial route 305 output on a display of the client computing device of the user. Returning to the description of FIG. 2, the progress of the user may be monitored (e.g., by the messaging engine 155 as described in FIG. 1, etc.) to determine the progression of the user toward the destination (e.g., at operation 240).

Figure 3B:
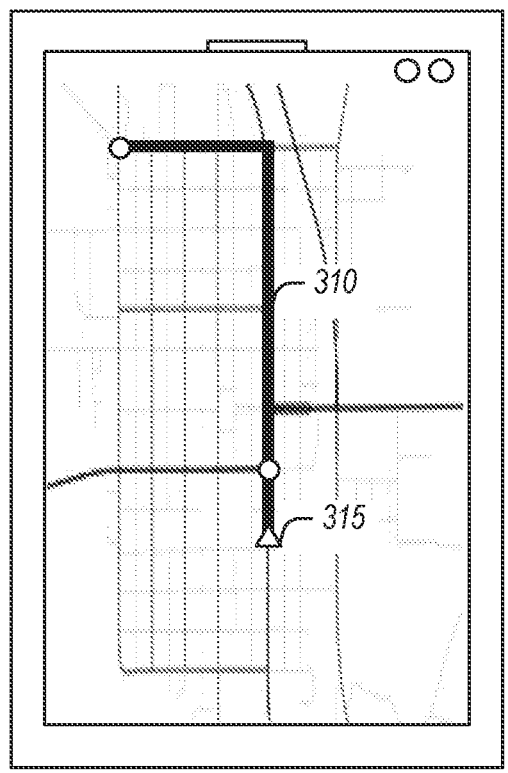

It may be determined if the user has reached a segment checkpoint (e.g., at decision 245). If not, progress monitoring continues (e.g., at operation 240). If a segment checkpoint is reached (as determined at decision 245), it is determined (e.g., by the messaging engine 155 as described in FIG. 1, etc.) if a notification should be transmitted. FIG. 3B illustrates a user reaching a segment checkpoint 315. Returning to the description of FIG. 2, if a notification is to be transmitted (e.g., as determined at decision 250), a progress notification may be transmitted (e.g., by the messaging engine 155 as described in FIG. 1, etc.) to a computing device of another user (e.g., at operation 255). Upon transmission of the notification (e.g., at operation 255) or if no notification is to be transmitted (e.g., as determined at decision 250), it is determined (e.g., by the messaging engine 155 in conjunction with the route segmentation engine 165 as described in FIG. 1, etc.) if an additional segment is available to be transmitted to the computing device of the user (e.g., at operation 260). If so, the next route segment is transmitted to the user computing device (e.g., at operation 235). FIG. 3B illustrates a next route segment 310 transmitted to a user computing device.

Returning to the description of FIG. 2, when a checkpoint has been reached (e.g., as determined at decision 245) and there are no additional route segments remaining (e.g., as determined at operation 260), it may be determined if the destination may be revealed (e.g., at decision 265). In an example, revealment of the destination may be automatically authorized when the user reaches the final checkpoint (e.g., as determined at decision 245). In another example, a notification may be transmitted to another user (e.g., at operation 255) that requests authorization to reveal the destination and it may be determined that revealment is authorized based on a response received to the authorization request notification.

If authorization is received (e.g., as determined at decision 265), a destination notification may be transmitted (e.g., by the messaging engine 155 as described in FIG. 1, etc.) to the computing device of the user. In an example, walking route guidance may be generated and transmitted (e.g., by the messaging engine 155 in conjunction with the route segmentation engine 165 as described in FIG. 1, etc.) to the computing device of the user (e.g., at operation 285. If authorization is not received (e.g., as determined at decision 265), remediation may be initiated (e.g., at operation 270). For example, additional notifications may be transmitted to the other user, an automated authorization escalation instruction set may be accessed and followed to determine authorization, etc. It may be determined if the remediation was successful such that authorization has been received (e.g., at decision 275). If so, the destination notification may be transmitted to the computing device of the user (e.g., at operation 280). If the remediation is not successful (e.g., at determined at decision 275), the data is purged (or secured and archived) and the process ends (e.g., at operation 295). It may be determined if the user has destinated (i.e., "arrived") (e.g., at decision 290). If so, the data is purged (or secured and archived) and the process ends (e.g., at operation 295). If the user has not destinated (e.g., as determined at decision 290), the destination information may be retransmitted to the computing device of the user (e.g., at operation 280).

Figure 4:
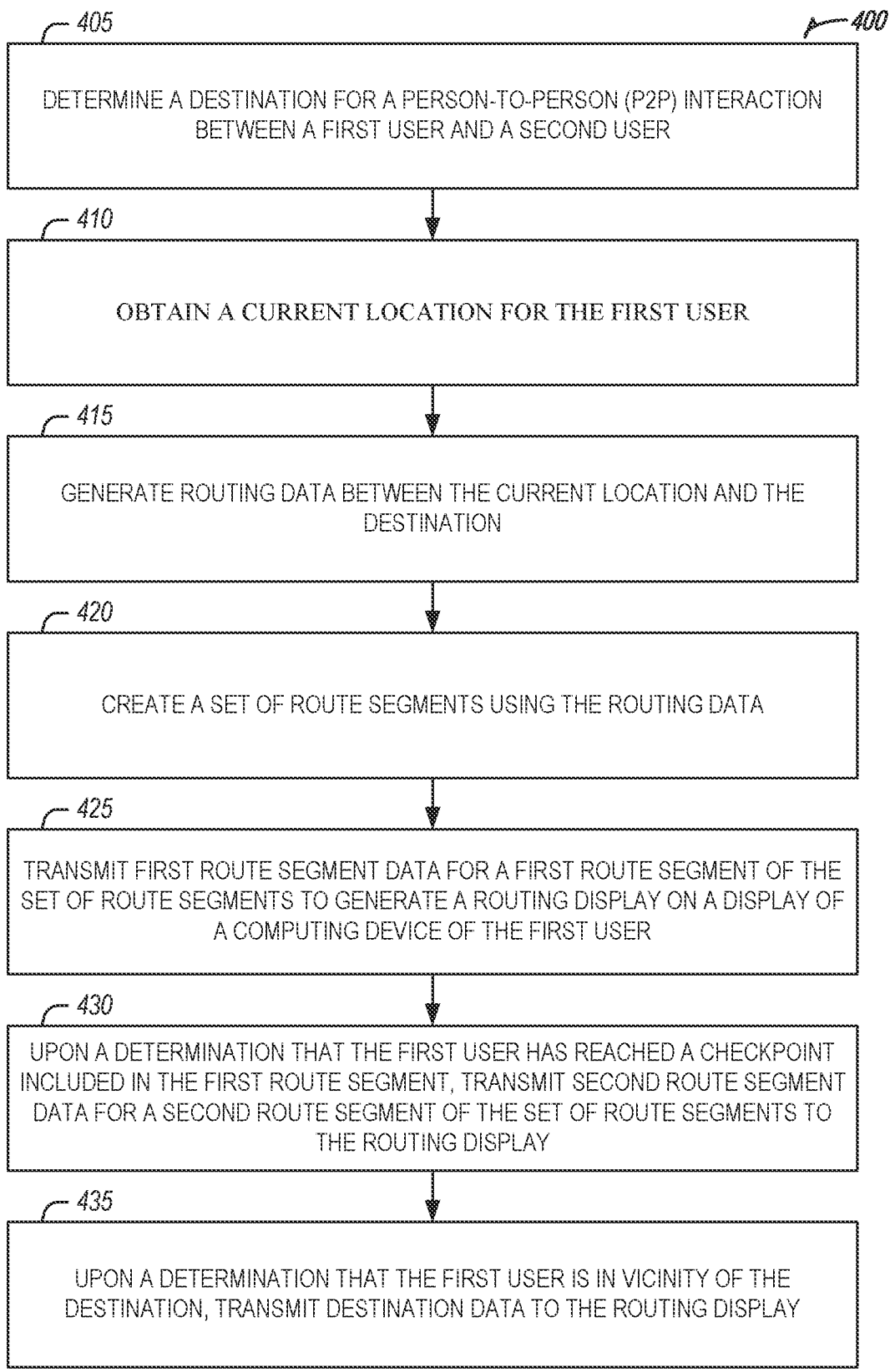
FIG. 4 illustrates an example of a method for a two-way privacy enabled mapping and routing platform, according to an embodiment.

FIG. 4 illustrates an example of a method 400 for a two-way privacy enabled mapping and routing platform, according to an embodiment. The method 400 may provide features as described in FIGS. 1, 2, 3A, and 3B.

A destination may be determined for a person-to-person (P2P) interaction between a first user and a second user (e.g., at operation 405). In an example, a set of publicly accessible locations may be obtained that are near a location provided by the second user. A publicly accessible location may be selected from the set of publicly accessible locations based on meeting configuration options and the destination may be set as the publicly accessible location. In an example, routing guidance may be generated from a location of the second user to the destination and the routing guidance may be transmitted to a computing device of the second user.

In an example, a first set of destination configuration options for the first user and a second set of destination configuration options for the second user may be obtained. The first set of destination configuration options may be compared to the second set of destination configuration options to identify an overlapping set of destination configuration options. A current location of the second user may be obtained. A midpoint between the current location of the first user and the current location of the second user may be determined. A set of locations near the midpoint may be identified from a geographical information data source and the destination may be determined by evaluating the set of locations using the overlapping set of destination options as input to a fit function.

A current location may be obtained for the first user (e.g., at operation 410). Routing data may be generated between the current location and the destination (e.g., at operation 415). A set of route segments may be created using the routing data (e.g., at operation 420). First route segment data for a first route segment of the set of route segments may be transmitted to generate a routing display on a display of a computing device of the first user (e.g., at operation 425). Upon a determination that the first user has reached a checkpoint included in the first route segment, second route segment data for a second route segment of the set of route segments may be transmitted to the routing display (e.g., at operation 430). Upon a determination that the first user is in vicinity of the destination, destination data may be transmitted to the routing display (e.g., at operation 435). In an example, a route cancellation request may be received from the second user and instructions may be transmitted to the routing display to cease display of route segments and delete route data.

Figure 5:
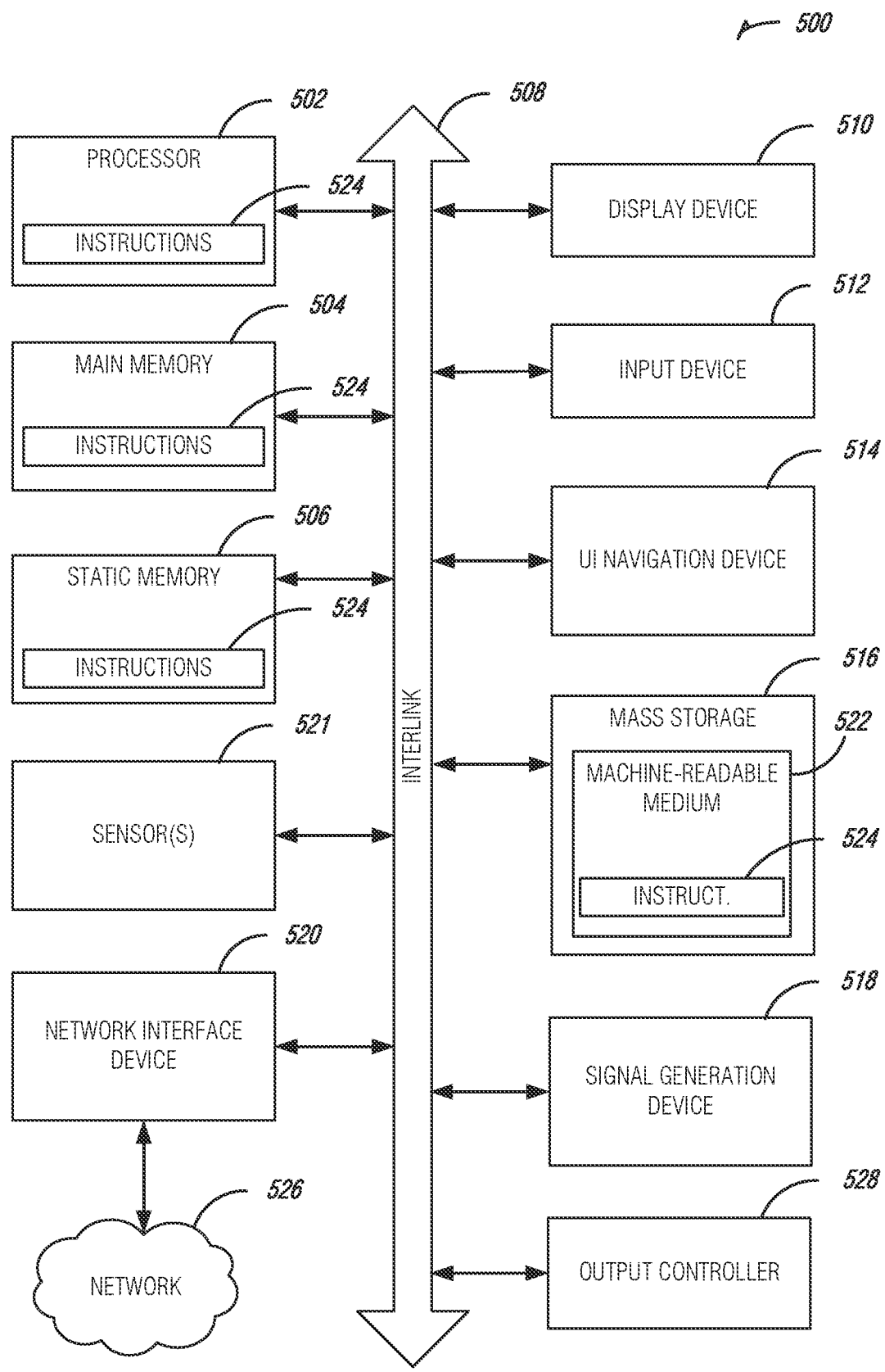
FIG. 5 is a block diagram illustrating an example of a machine upon which one or more embodiments may be implemented.

In an example, a notification schedule may be determined for the second user. The notification schedule may define checkpoints in the set of route segments that trigger progression notification transmission. It may be identified that the first user has reached a checkpoint defined in the notification schedule and a progression notification may be transmitted to a computing device of the second user that includes an estimated time of arrival of the first user. In an example, an expected time of traversal may be calculated for the first route segment. It may be determined that the first user has not initiated traversal of the first route segment upon expiration of the expected time of traversal and a notification may be transmitted to the second user that includes an indication that first route traversal has not been initiated FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensors. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for two-way privacy enable destination routing comprising:
   at least one processor; and
   memory including instructions that, when executed by the at least one processor, cause the at least one processor to perform operations to:
      determine a destination for a person-to-person (P2P) interaction between a first user and a second user;
      obtain a current location for the first user;
      generate routing data between the current location and the destination;
      create a set of route segments using the routing data;
      transmit first route segment data for a first route segment of the set of route segments to generate a routing display on a display of a computing device of the first user without an indication of the destination;
      upon a determination that the first user has reached a checkpoint included in the first route segment, transmit second route segment data for a second route segment of the set of route segments to the routing display without an indication of the destination; and
      upon a determination that the first user is in vicinity of the destination, transmit destination data to the routing display, the destination data including at least an identity of the destination.

2. The system of claim 1, the memory further comprising instructions that, when executed by the at least one processor, cause the at least one processor to perform operations to:
   determine a notification schedule for the second user, wherein the notification schedule defines checkpoints in the set of route segments that triggers transmission of a progression notification;
   identify that the first user has reached a checkpoint defined in the notification schedule; and
   transmit the progression notification to a computing device of the second user that includes an estimated time of arrival of the first user.

3. The system of claim 1, the memory further comprising instructions that, when executed by the at least one processor, cause the at least one processor to perform operations to:
   receive a route cancellation request from the second user;
   transmit a cancellation indication to the first user; and
   transmit instructions to the routing display to cease display of route segments and delete route data.

4. The system of claim 1, wherein the instructions to determine the destination for the P2P interaction between the first user and the second user further comprises instructions that, when executed by the at least one processor, cause the at least one processor to perform operations to:
   obtain a first set of destination configuration options for the first user and a second set of destination configuration options for the second user;
   compare the first set of destination configuration options to the second set of destination configuration options to identify an overlapping set of destination configuration options;
   obtain a current location of the second user;
   determine a midpoint between the current location of the first user and the current location of the second user;
   identify, from a geographical information data source, a set of locations within a distance radius of the midpoint; and
   determine the destination by evaluating the set of locations using the overlapping set of destination configuration options.

5. The system of claim 1, further comprising instructions that, when executed by the at least one processor, cause the at least one processor to perform operations to:
   calculate an expected time of traversal for the first route segment;
   determine that the first user has not initiated traversal of the first route segment upon expiration of the expected time of traversal; and
   transmit a notification to the second user that includes an indication that first route traversal has not been initiated.

6. The system of claim 1, the instructions to determine the destination for the P2P interaction between the first user and the second user further comprising instructions that, when executed by the at least one processor, cause the at least one processor to perform operations to:
   obtain a set of publicly accessible locations near a location provided by the second user;
   select a publicly accessible location from the set of publicly accessible locations based on meeting configuration options; and
   set the destination as the publicly accessible location.

7. The system of claim 6, further comprising instructions that, when executed by the at least one processor, cause the at least one processor to perform operations to:
   generate routing guidance from a location of the second user to the destination; and transmit the routing guidance to a computing device of the second user.

8. At least one non-transitory machine-readable medium including instructions for two-way privacy enable destination routing that, when executed by at least one processor, cause the at least one processor to perform operations to:
    determine a destination for a person-to-person (P2P) interaction between a first user and a second user;
    obtain a current location for the first user;
    generate routing data between the current location and the destination;
    create a set of route segments using the routing data;
    transmit first route segment data for a first route segment of the set of route segments to generate a routing display on a display of a computing device of the first user without an indication of the destination;
    upon a determination that the first user has reached a checkpoint included in the first route segment, transmit second route segment data for a second route segment of the set of route segments to the routing display without an indication of the destination; and
    upon a determination that the first user is in vicinity of the destination, transmit destination data to the routing display, the destination data including at least an identity of the destination.

9. The at least one non-transitory machine-readable medium of claim 8, further comprising instructions that, when executed by the at least one processor, cause the at least one processor to perform operations to:
    determine a notification schedule for the second user, wherein the notification schedule defines checkpoints in the set of route segments that triggers transmission of a progression notification;
    identify that the first user has reached a checkpoint defined in the notification schedule; and
    transmit the progression notification to a computing device of the second user that includes an estimated time of arrival of the first user.

10. The at least one non-transitory machine-readable medium of claim 8, further comprising instructions that, when executed by the at least one processor, cause the at least one processor to perform operations to:
    receive a route cancellation request from the second user;
    transmit a cancellation indication to the first user; and
    transmit instructions to the routing display to cease display of route segments and delete route data.

11. The at least one non-transitory machine-readable medium of claim 8, wherein the instructions to determine the destination for the P2P interaction between the first user and the second user further comprises instructions that, when executed by the at least one processor, cause the at least one processor to perform operations to:
    obtain a first set of destination configuration options for the first user and a second set of destination configuration options for the second user;
    compare the first set of destination configuration options to the second set of destination configuration options to identify an overlapping set of destination configuration options;
    obtain a current location of the second user;
    determine a midpoint between the current location of the first user and the current location of the second user;
    identify, from a geographical information data source, a set of locations within a distance radius of the midpoint; and
    determine the destination by evaluating the set of locations using the overlapping set of destination configuration options.

12. The at least one non-transitory machine-readable medium of claim 8, further comprising instructions that, when executed by the at least one processor, cause the at least one processor to perform operations to:
    calculate an expected time of traversal for the first route segment;
    determine that the first user has not initiated traversal of the first route segment upon expiration of the expected time of traversal; and
    transmit a notification to the second user that includes an indication that first route traversal has not been initiated.

13. The at least one non-transitory machine-readable medium of claim 8, the instructions to determine the destination for the P2P interaction between the first user and the second user further comprising instructions that, when executed by the at least one processor, cause the at least one processor to perform operations to:
    obtain a set of publicly accessible locations near a location provided by the second user;
    select a publicly accessible location from the set of publicly accessible locations based on meeting configuration options; and
    set the destination as the publicly accessible location.

14. The at least one non-transitory machine-readable medium of claim 13, further comprising instructions that, when executed by the at least one processor, cause the at least one processor to perform operations to:
    generate routing guidance from a location of the second user to the destination; and
    transmit the routing guidance to a computing device of the second user.

15. A method for two-way privacy enable destination routing comprising:
    determining a destination for a person-to-person (P2P) interaction between a first user and a second user;
    obtaining a current location for the first user;
    generating routing data between the current location and the destination;
    creating a set of route segments using the routing data;
    transmitting first route segment data for a first route segment of the set of route segments to generate a routing display on a display of a computing device of the first user without an indication of the destination;
    upon determining that the first user has reached a checkpoint included in the first route segment, transmitting second route segment data for a second route segment of the set of route segments to the routing display without an indication of the destination; and
    upon determining that the first user is in vicinity of the destination, transmitting destination data to the routing display, the destination data including at least an identity of the destination.

16. The method of claim 15, further comprising:
    determining a notification schedule for the second user, wherein the notification schedule defines checkpoints in the set of route segments that triggers transmission of a progression notification;
    identifying that the first user has reached a checkpoint defined in the notification schedule; and
    transmitting the progression notification to a computing device of the second user that includes an estimated time of arrival of the first user.

17. The method of claim 15, further comprising:
receiving a route cancellation request from the second user;
transmitting a cancellation indication to the first user; and
transmitting instructions to the routing display to cease display of route segments and delete route data.

18. The method of claim 15, wherein determining the destination for the P2P interaction between the first user and the second user further comprises:
obtaining a first set of destination configuration options for the first user and a second set of destination configuration options for the second user;
comparing the first set of destination configuration options to the second set of destination configuration options to identify an overlapping set of destination configuration options;
obtaining a current location of the second user;
determining a midpoint between the current location of the first user and the current location of the second user;
identifying, from a geographical information data source, a set of locations within a distance radius of the midpoint; and
determining the destination by evaluating the set of locations using the overlapping set of destination configuration options.

19. The method of claim 15, further comprising:
calculating an expected time of traversal for the first route segment;
determining that the first user has not initiated traversal of the first route segment upon expiration of the expected time of traversal; and
transmitting a notification to the second user that includes an indication that first route traversal has not been initiated.

20. The method of claim 15, wherein determining the destination for the P2P interaction between the first user and the second user further comprises:
obtaining a set of publicly accessible locations near a location provided by the second user;
selecting a publicly accessible location from the set of publicly accessible locations based on meeting configuration options; and
setting the destination as the publicly accessible location.

\* \* \* \* \*